United States Patent
Schuller et al.

[11] Patent Number: 5,921,314
[45] Date of Patent: Jul. 13, 1999

[54] CONDITIONED SEAT

[75] Inventors: Ferdinand Schuller, Königsbrunn; Hans-Georg Rauh; Günter Lorenzen, both of Olching; Michael Weiss, Benediktbeuern, all of Germany

[73] Assignee: W.E.T. Automotive Systems Aktiengesellschaft, Germany

[21] Appl. No.: 08/894,316

[22] PCT Filed: Feb. 14, 1996

[86] PCT No.: PCT/EP96/00638

§ 371 Date: Oct. 7, 1997

§ 102(e) Date: Oct. 7, 1997

[87] PCT Pub. No.: WO96/25301

PCT Pub. Date: Aug. 22, 1996

[30] Foreign Application Priority Data

Feb. 14, 1995 [DE] Germany .......................... 195 04 716
Dec. 22, 1995 [DE] Germany .......................... 195 48 527

[51] Int. Cl.$^6$ .............................. B60H 3/00; F25D 23/12; A47C 7/74
[52] U.S. Cl. ...................... 165/43; 297/180.1; 454/907; 62/261
[58] Field of Search ........................ 165/42, 43, 104.21; 297/180.1; 62/3.2, 3.4, 3.61, 261; 454/907

[56] References Cited

U.S. PATENT DOCUMENTS

| | | |
|---|---|---|
| 4,572,430 | 2/1986 | Takagi et al. . |
| 5,117,638 | 6/1992 | Feher .......................................... 62/3.2 |
| 5,450,894 | 9/1995 | Inoue ......................................... 165/43 |
| 5,613,730 | 3/1997 | Buie ..................................... 297/180.12 |

FOREIGN PATENT DOCUMENTS

| | | |
|---|---|---|
| 4112631C1 | 4/1992 | Germany . |
| 9405187 | 3/1994 | WIPO . |
| 9514899 | 1/1995 | WIPO . |

*Primary Examiner*—Ira S. Lazarus
*Assistant Examiner*—Lance Chandler
*Attorney, Agent, or Firm*—Rothwell, Figg, Ernst & Kurz, p.c.

[57] ABSTRACT

The conditioned seat, has at least one seat contact surface (31), the outer side of which faces towards part of a passenger in the seat. An air-conditioning device (18) supplies conditioned air to the region of the inner side of the seat contact surface (31). An electrical heating element (24) is arranged in the region of the inner side of the seat contact surface (31) for warming the seat contact surface (31). A temperature sensor (28) detects the temperature in the region of the seat contact surface (31). For achieving a fast adjustment of the seat temperature to a preset desired temperature independent from the ambient temperature a controlling system (20) is provide which is in connection both with the air-conditioning device (18) and with the electrical heating element (24) and controls these corresponding to a pre-set desired temperature value in dependence on the temperature measured by the temperature sensor (28).

17 Claims, 2 Drawing Sheets

CONDITIONED SEAT

The invention relates to a conditioned seat that has at least one seat contact surface, the outer side of which faces towards part of a passenger in the seat, an air-conditioning device which supplies air to the region of the inner side of the seat contact surface, the water vapour partial pressure of which air is less than in the microclimate between seat contact surface and a passenger in the seat, an electrical heating element arranged in the region of the inner side of the seat contact surface for warming the seat contact surface, a temperature sensor for detecting the temperature in the region of the seat contact surface, and a controlling system which is in connection both with the air-conditioning device and with the electrical heating element and controls these corresponding to a pre-set desired temperature value in dependence on the temperature measured by the temperature sensor.

Such a conditioned seat is known from the U.S. Pat. No. 4,572,430.

The human body's thermal balance is of critical importance for a person's sense of wellbeing. If that thermal balance is hindered as a result of contact of a relatively large part of the body surface with the seat surface of a motor vehicle seat, one's sense of well-being is adversely affected and in an extreme case health may suffer.

To solve that problem in the case of cold environmental conditions, heating systems for automobile seats are known which heat the cold vehicle seat within a short time to a temperature that feels comfortable for the passenger in the seat.

But even in hot environmental conditions, for example, in summer, it is undesirable for the body's thermal balance to be upset. The heat produced by the body and supplied to the body from its surroundings is dissipated again partly by loss of moist heat (transpiration) and partly by loss of dry heat (convection). This heat loss is prevented, however, by insulation of the body against the seat surfaces with which it is in contact.

For that reason perspiration will form under hot environmental conditions after a relatively long car journey, even on the best vehicle seat. This perspiration formation becomes disagreeably noticeable on getting out of the car, as one's clothing is damp with perspiration in places. To avoid clothing becoming damp in this manner, DE 41 12 631 C1 proposes a vehicle seat which in the back rest has a duct adjoining the inner side of the seat contact face of the back rest, and air flows through this duct. In the duct there is arranged an airdrying device which cools the air flowing through the duct to below dewpoint so that water contained in the air condenses and is then discharged from the duct. The seat contact surface is permeable to water vapour and largely impermeable to the air flowing through the duct.

The air dehydrated by the airdrying device is then warmed again, to that the relative humidity of that air drops. The water vapour partial pressure is therefore very low, and the air is able to absorb water vapour coming through the seat contact surface until saturation pressure is reached. In this manner water vapour that has passed through the seat contact surface can be removed and the seat contact surface can be kept dry.

In the case of the known vehicle seat, the airdrying device serves purely for the dissipation of moisture at the outside of the seat contact surface. There is no provision for a temperature control by means of the airdrying device.

The invention is based on the problem of producing a conditioned seat using structurally simple means, in which the temperature of the seat contact surface is adjustable in a simple manner independently of the ambient conditions, wherein at the same time uniform temperature balance and a removal of moisture from the seat contact surface is ensured.

This problem is solved by the invention of a conditioned seat with the features according to claim 1.

Depending on the position of the sensor, the temperature sensor can be constructed as a dry temperature sensor or as a wet temperature sensor, which also measures the latent heat of vaporisation.

Since the controlling system in the case of the conditioned seat according to the invention is in connection with the air-conditioning device and with the electrical heating element, it is possible to bring the conditioned seat in a short time to the desired temperature, regardless of the ambient conditions, that is, when the seat contact surface is heated for example by the sun or in winter has an initial temperature of −20° C., and to hold that temperature constant, at the same time ensuring that moisture is removed from the seat contact surface. Setting of the desired temperature can be effected by a single climatic condition controller.

An air-conditioning device can be used which controls only the temperature of the ambient air supplied to the region of the inner side of the seat contact surface, since the water vapour partial pressure of the ambient air is as a rule sufficiently low to remove moisture from the seat contact surface.

Preferably, however, both the temperature and the humidity of the air generated by the air-conditioning device is controllable by means of the controlling system. This enables a very hot seat to be cooled down quickly, the desired temperature to be maintained subsequently and moisture to be removed better by virtue of the still relatively low water vapour partial pressure.

In a preferred practical form, the controlling system is formed by a microprocessor in which families of characteristics for control of the air-conditioning device and of the electrical heating element as a function of the measured temperature are stored. In this way it is possible automatically to set a correct temperature in dependence on the initial temperature.

Material parameters for the region between the seat contact surface and the air-conditioning device can be taken into account in the families of characteristics.

When using an air-conditioning device with a dehumidifying function, this arrangement advantageously has a Peltier element having a first heat exchanger on the cooling side and a second heat exchanger on the heating side, the first and the second heat exchangers extending into an air duct that is in connection in the direction of flow downstream of the second heat exchanger with an air supply system which supplies the air flowing through the second heat exchanger to the region of the inner side of the seat contact surface.

The second heat exchanger extends preferably into a cooling duct through which cooling air can flow.

The temperature and the humidity of the air leaving the air-conditioning device can be controlled specifically, if a respective fan is arranged in the air duct and in the cooling duct, the speed of rotation of which fan is controllable by the controlling system.

The water that has condensed in the air duct can be drawn off by a wick which is arranged in the air duct downstream of the first heat exchanger and extends to the heating side of the Peltier element.

Control of the temperature of the conditioned seat is effected at a high initial temperature of the region of the seat contact surface preferably in such a manner that the air-conditioning device is operated so that the air supplied by it to the region of the seat contact surface cools the temperature of the seat contact surface quickly and for a short time to a temperature that lies clearly below a pre-set desired temperature, and subsequently the air-conditioning device is operated so that by means of the air supplied by it to the region of the seat contact surface the desired temperature is reached and substantially maintained.

On the other hand, at a low initial temperature of the region of the seat contact surface the electrical heating element is advantageously operated at full capacity until a desired temperature is reached, after reaching the desired temperature the air-conditioning device is additionally operated, and the output of the electrical heating element is reduced, the desired temperature being substantially maintained. Once the seat contact surface and the regions surrounding it have been heated right through, the electrical heating element is switched off and the air-conditioning device is operated so that by means of the conditioned air supplied by it to the region of the seat contact surface the desired temperature is reached and substantially maintained.

Exemplary embodiments of the invention are explained hereinafter with reference to the drawings, in which.

Figure 1:
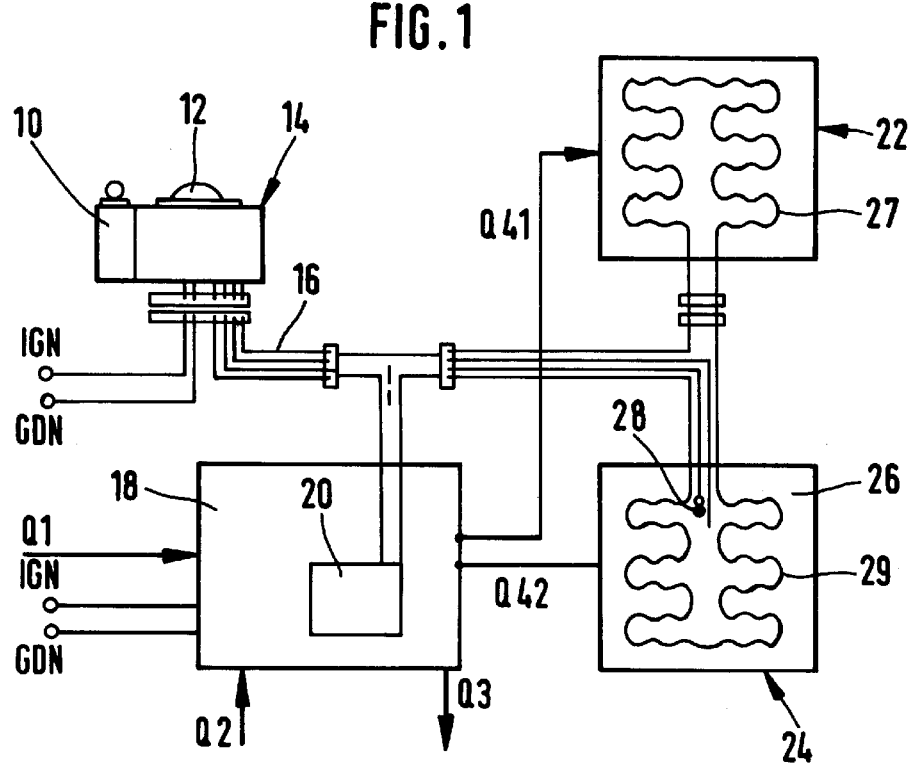
FIG. 1 shows diagrammatically the construction of a conditioning device of a conditioned seat.

FIG. 1 shows diagrammatically the back rest 22 and the seat part 24 of a conditioned seat for a vehicle. Sheet-type heating elements 26 and 27 of a known automobile heating system are arranged in known manner on the back rest 22 and the seat part 24 respectively; each sheet-type heating element has a linearly laid heating conductor 29 which consists, for example, of copper. The heating conductors 29 are connected to a current source (not shown), the current flowing through the heating conductors 29 being regulated by means of a microprocessor 20 serving as a controlling system.

The microprocessor 20 moreover controls the temperature and the degree of humidity of air mass flows Q41 and Q42, which are supplied by an air-conditioning device 18 to the seat contact surface of the seat part 24 and the back rest 22.

Connected by way of leads 16 to the input side of the controlling system 20 is a climatic condition controller 14, which has an on-off switch 10 and a set-point adjuster 12 having, for example, six positions. By means of the set-point adjuster 12, the passenger in the seat can select the temperature he wants (desired temperature value). The desired temperature value is pre-set, for example, by way of a resistance value of a potentiometer, a resistance decade or other variable resistance value.

The actual temperature in the region of the seat contact surface of the seat part 24 is detected, for example, by an NTC temperature sensor 28 and a corresponding temperature signal is entered in the microprocessor 20. Families of characteristics are stored in the microprocessor, by means of which the microprocessor 20 controls the air-conditioning device 18 and the electrical sheet-type heating elements 26, 27 in dependence on the initial temperature of the seat contact surface of the seat part 24 and/or the back rest 22.

Material parameters of the conditioned seat, such as, for example, the air permeability of the seat covering, the structure of the conditioned seat between the air-conditioning arrangement 18 and the particular seat contact surface, the moisture migration into this area in dependence on the partial pressures obtaining, the thermal conductivity etc., can be taken into account in the families of characteristics at the same time.

Figure 2:
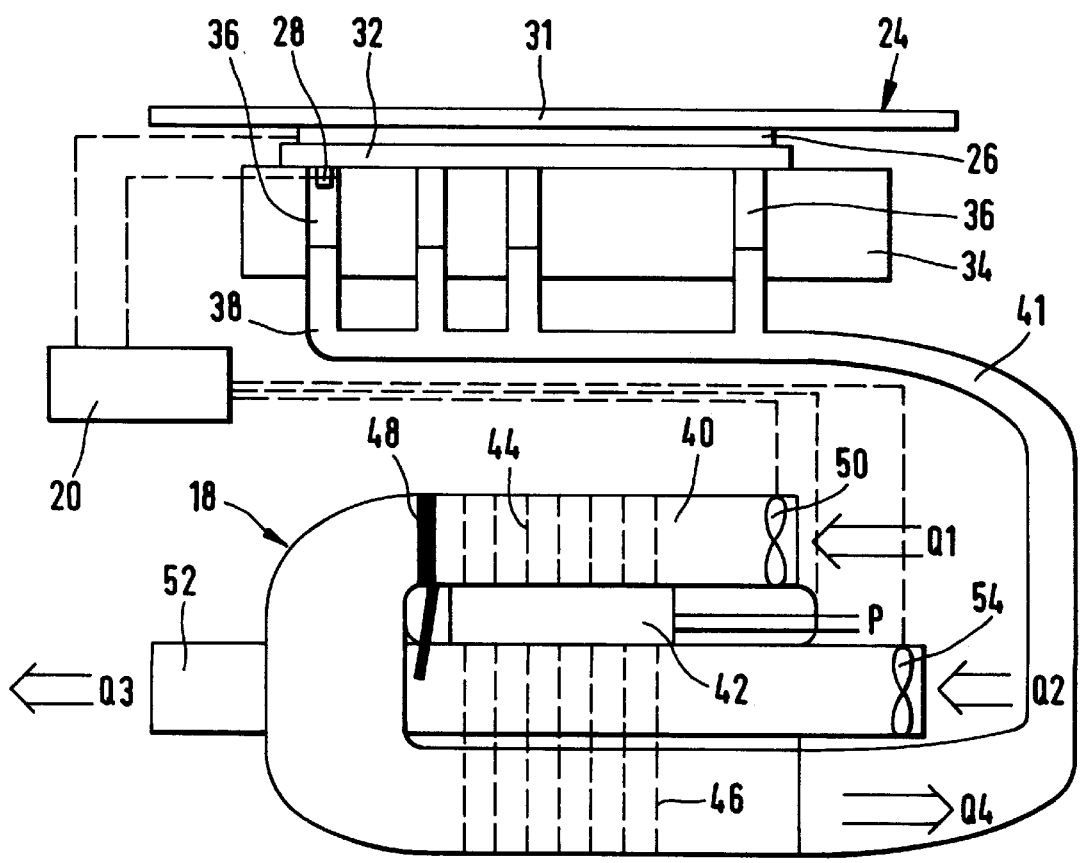
FIG. 2 shows the conditioning of the seat surface of a conditioned seat by the conditioning device provided with an air-drying device as the air-conditioning device.

The construction of the conditioning device is explained in more detail in FIG. 2 with reference to the conditioning of the seat part 24 of a conditioned seat. The seat part 24 of the conditioned seat has a seat contact surface 31 permeable to air and water vapour and made of fabric or perforated or porous leather, adjoining the lower inner side of which is a sheet-type electrical heating element 26 permeable to air and water vapour, as described, for example, in DE 30 40 888 A1. On the side lying opposite the seat contact surface 31, beneath the electrical sheet-type heating element 26 there is arranged an intermediate layer 32 of upholstery material permeable to air and water vapour, which even in a compressed state satisfies minimum requirements in respect of permeability to air and water vapour; this intermediate layer lies on top of foamed padding 34.

In the foamed padding 34 there are provided several vertical continuous supply ducts 36 which extend from the underside to the top side of the foamed padding 34 beneath the intermediate layer 32. In the upper region of the supply duct 36 on the left in FIG. 2 a temperature sensor 28 is arranged on the underside of the intermediate layer 32.

Inserted in each supply duct 36 is a branch pipe 38 which is connected to a main pipe 41 of the air-conditioning arrangement 18, which adjoins the discharge end of an air duct 40. The supply ducts 36, the branch pipe 38 and the main pipe 41 form a air supply system. The air duct 40 is of U-shaped construction in the longitudinal direction. Arranged at the air inlet side of the air duct 40 connected to the ambient air is a ventilating fan 50 by means of which ambient air is blown into the air duct 40 and flows through the air duct 40.

Adjoining the intake-end arm of the air duct 40 a Peltier element 42 is arranged between the two arms of the air duct 40; the cooling side of the Peltier element 42 faces towards the intake-end arm and the heating side thereof faces towards the discharge-end arm of the air duct 40. A heat exchanger 44, which extends through the intake-end arm of the air duct 40 is provided on the cooling side of the Peltier element 42. The heat exchangers are constructed as multiple-leaf heat exchangers which are optimised in respect of overall size, flow resistance and heat transmission.

A wick 48 which is connected to the heating side of the Peltier element 42 is arranged downstream of the first heat exchanger 44 in the intake-end arm of the air duct 40.

A second heat exchanger 46 is provided on the heating side of the Peltier element 42; this heat exchanger extends, adjacent to the heating side of the Peltier element 42, through a cooling duct 52 running parallel to the arms, and then into the discharge-end arm of the air duct 40. A ventilating fan 54 by means of which ambient air Q2 can be drawn into the cooling duct 52 is provided at the intake end of the cooling duct 52.

On the basis of the above-mentioned construction of the air-conditioning device, an air mass flow Q1 drawn by the fan 50 into the air duct 40 is cooled by the first heat exchanger 44 arranged on the cooling side of the Peltier element 42 to below dew point, so that water contained in the air condenses and is precipitated. This water is drawn off by way of the wick 48 to the heating side of the Peltier element 42 where it is evaporated into the ambient air.

The dehumidified air then flows through the second heat exchanger 46, by which it is warmed, with the result that the relative humidity of the air is further reduced. The air conditioned in this manner is subsequently blown via the main pipe 41 and the branch piping 38 into the supply ducts 38.

The seat materials and the air conduction are selected so that the conditioned air interacts with the upper seat structures and with the air between seat and seat passenger and drying is effected by virtue of the water vapour partial pressure difference.

Once interaction has taken place, part of the air flows through the foamed material 34 back into the ambient air, whilst the other part escapes past the passenger in the seat.

At a given capacity P for the Peltier element 42, the cooling of the air flow Q1 can be regulated via the speed of the fan 50. By suitable choice of the speed of the fan 54 the temperature of the air mass flow Q4 leaving the air duct 40 can be specifically cooled, since the ambient air drawn by the fan 54 into the cooling duct 52 flows through the second heat exchanger 46 and thus reduces the temperature thereof. The air flowing through the cooling duct 52 is delivered as air mass flow Q3 to the atmosphere. The temperature of the air mass flow Q4 is therefore directly dependent on the speed of the fan 54.

The electrical heating element 26, the fans 50 and 54 and the Peltier element 42 are in connection with the microprocessor 20 and are regulated by this in dependence on the actual temperature measured by the temperature sensor 28 connected to the input side of the microprocessor and on the pre-set desired temperature.

When the conditioning device is put into operation by the passenger in the seat by switching on the on-off switch 10 and the appropriate desired temperature has been set at the climatic condition controller, the temperature sensor 28 supplies a temperature signal corresponding to the initial temperature in the region of the seat contact surface 31 to the microprocessor 20.

Depending on the initial temperature and the pre-set desired temperature, the controlling system 20 determines by means of the stored families of characteristics the controlled system of the electrical heating element 26, the fans 50, 54 and the Peltier element 42.

When the initial temperature measured by the temperature sensor 28 is very cold, for example −20° C. in winter, control is effected so that the microprocessor 20 activates the heating element 26 and heats up the seat at full power to the desired temperature $T_{set}$ selected at the set-point adjuster. Once the desired temperature $T_{set}$ has been reached, the air-conditioning device 18 is also switched on and the power output of the electrical heating element 26 is reduced. Both the electrical heating element 26 and the air-conditioning device 18 ensure that the seat is warmed uniformly. The air-conditioning device 18 additionally ensures that moisture is removed from the seat contact surface 31 of the seat part 24. Only when the seat part 24 has been heated through completely is the electrical heating element 26 switched off and thermal regulation of the seat contact surface 31 is carried out solely by the air-conditioning device 18 through control of the fans 50 and 54 and the Peltier element 42.

Since the seat part 24 has a very large heat storage capacity at low temperature level, switching off the electrical heating element 26 too early would lead to renewed cooling of the seat contact surface 31.

However, if the seat contact surface 31 of the seat part 24 is heated up by the sun when the conditioning system is in operation, its temperature can reach 60° C. or more. In that case, the seat contact surface 31 of the seat part 24 is quickly cooled down by blowing cool, dry air into the seat part using the air-conditioning device 18.

In this connection cooling is for a short period so intense that the temperature falls briefly clearly below the desired temperature $T_{set}$ set by means of the set-point adjuster 12, for example, to about 28° C.

A brief cooling effect is achieved by this, which allows a rapid heat dissipation from the body, thus suppressing a tendency to sweat that would otherwise occur. Moreover, the brief cooling effect has the advantage that the passenger in the seat notices the effectiveness of the conditioning device. Since the duration of the noticeable cooling is very short, any health risk for the passenger in the seat is avoided.

After this "cooling-down effect", the microprocessor 20 controls the air-conditioning device 18 so that the seat temperature, that is, the actual temperature measured by the temperature sensor, corresponds to the desired temperature set at the controller.

During operation it can be useful to provide such a short "cooling-down effect" from time to time. This can alternate between seat surface and back rest so that it is more apparent to the passenger in the seat.

Throughout the entire operating time the air-conditioning device 18 removes the moisture occurring in the microclimate between seat contact surface and seat passenger.

In moderate ambient conditions, that is, when the actual temperature measured by the temperature sensor 28 on activation of the conditioning device lies within the temperature range pre-set by the set-point adjuster 12, the air-conditioning device 18 is activated so that it removes only the moisture in the microclimate and controls the seat temperature in the region of the pre-set desired temperature $T_{set}$.

Conditioning of the back rest 22 of the conditioned seat can be effected in the same way.

Figure 3:
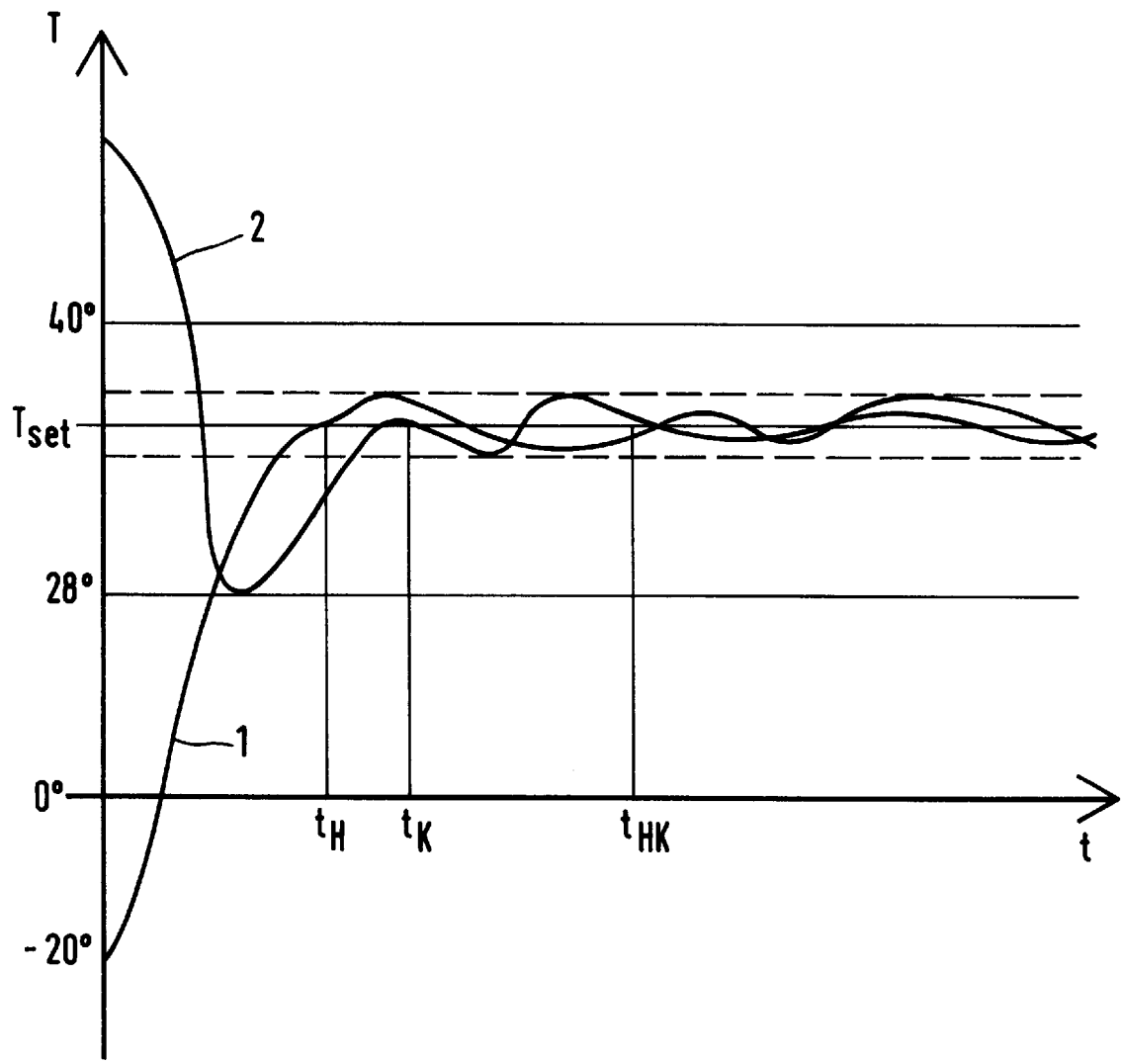
FIG. 3 is a diagram showing the temperature control of the conditioned seat in dependence on the initial temperature.

The control curves in the case of a very cold and a very warm conditioned seat are shown in FIG. 3. In the diagram shown in FIG. 3 the time t is plotted along the abscissa and the temperature T of the conditioned seat in the region of the seat contact surface 31 is plotted vertically. $T_{set}$ is the desired temperature pre-settable by the set-point adjuster 12. The desired temperature can be adjusted between about 32° C. and 41° C. This temperature range is medically quite safe for the human body.

Curve 1 in FIG. 3 shows warming of the seat where the initial temperature is −20° C. At the time $t_H$, at which the seat is heated to the desired temperature, only the electrical sheet-type heating element is effective and is operated at full power. Subsequently, up to the time $t_{HK}$, the temperature of the seat is maintained in the region of the desired temperature $T_{set}$ by means of the electrical heating element and the air-conditioning device. From the time $t_{HK}$ only the air-conditioning device is effective to remove moisture and maintain the temperature of the seat.

Curve 2 shows the thermal control of the seat with a very high initial temperature of about 60° C. By means of the air-conditioning device 18 the temperature of the seat is rapidly lowered to a temperature of about 28° C., in order obtain the above-mentioned "cooling-down effect". The seat is subsequently brought only by means of the air-conditioning device 18 till the time $t_k$ to the desired temperature $T_{set}$. Once the desired temperature $T_{set}$ has been reached, the temperature of the seat and moisture removal from the seat is controlled by means of the air-conditioning device 18 so that the temperature remains in the region of the desired temperature $T_{set}$.

We claim:

1. A conditioned seat, comprising:

at least one seat contact surface, an outer side of which faces towards part of a passenger in said seat, an air-conditioning device which supplies air to a region of an inner side of said seat contact surface), said air having a water vapour partial pressure less than in a microclimate between said seat contact surface and a passenger in said conditioned seat, an electrical heating element arranged in said region of said inner side of said seat contact surface for warming said seat contact surface, a temperature sensor for detecting a temperature in said region of said inner side of said seat contact surface, and a controlling system which is in connection both with said air-conditioning device and with said electrical heating element and controls said air-conditioning device and said electrical heating element corresponding to a predetermined desired temperature value in dependence on said temperature measured by said temperature sensor, wherein said air-conditioning device comprises an air duct through which air is blown and a Peltier element having a first heat exchanger on a cooling side and a second heat exchanger on a heating side, said first heat exchanger extending into said air duct and said second heat exchanger extending into said air duct downstream of said first heat exchanger, a portion of said air duct downstream of said second heat exchanger being connected with an air supply system which supplies said air flowing through said air duct to said region of said inner side of said seat contact surface, with a drying means for drawing off water being arranged in said air duct between said first heat exchanger and said second heat exchanger.

2. Conditioned seat according to claim 1, wherein said temperature of said air supplied by said air-conditioning device is controllable by said controlling system.

3. Conditioned seat according to claim 1, wherein said temperature and an air humidity of said air supplied by said air-conditioning device is controllable by said controlling system.

4. Conditioned seat according to claim 1, wherein said controlling system is formed by a microprocessor in which families of characteristics for control of said air-conditioning device and of said electrical heating element as a function of a measured temperature are stored.

5. Conditioned seat according to claim 4, wherein material parameters for an inner region between said seat contact surface and said air-conditioning device are taken into account in said families of characteristics.

6. Conditioned seat according to claim 1, wherein said second heat exchanger further extends into a cooling duct through which cooling air can flow.

7. Conditioned seat according to claim 1, wherein a fan is arranged in said air duct and in said cooling duct respectively, with a fan speed of each said fan being controllable by said controlling system.

8. Conditioned seat according to claim 6, wherein said drying means is a wick which extends from a downstream side of said first heat exchanger to a downstream side of said second heat exchanger in said cooling duct.

9. Conditioned seat according to claim 1, wherein said air is repeatedly cooled for a short time to a temperature that lies clearly below a predetermined desired temperature.

10. Conditioned seat according to claim 1, wherein said seat contact surface of a back rest and of said seat surface are cooled alternatively.

11. A method for temperature and moisture conditioning a seat, comprising the steps of:

cooling ambient air to create cool air;

removing water moisture that is condensed out of said cool air to create cool dry air;

heating said cool dry air to create heated dry air having an increased ability to hold moisture by having a lowered water vapour partial pressure;

directing said heated dry air having a lowered water vapour partial pressure against an inner surface of a seat surface, wherein a temperature of said seat surface is lowered and moisture in a microclimate between said seat surface and a seat occupant is drawn through said seat surface and absorbed by said heated dry air due to a moisture-absorbing capacity of said heated dry air.

12. The method of claim 11, wherein said cooling and said heating are achieved through use of a Peltier element, with a cooling surface of said Peltier element communicating with a first heat exchanger, and a heating surface of said Peltier element communicating with a second heat exchanger.

13. The method of claim 11, wherein said step of removing said water moisture from said air further includes wicking away said water moisture that is condensed out of said cool dry air by said cooling step.

14. The method of claim 11, further including the steps of:

cooling said seat surface quickly and for a short time when said seat is at a high initial temperature to a predetermined cold temperature that is below a predetermined desired temperature to achieve a brief cooling effect which allows a rapid heat dissipation from said occupant; and allowing said seat surface to achieve said predetermined desired temperature;

wherein a rapid heat dissipation is achieved so that said occupant of said seat is thereby prevented from perspiring.

15. The method of claim 11, further including the steps of:

operating an electrical heating element at full capacity when said seat is at a low initial temperature until a predetermined desired temperature is reached;

additionally operating an air-conditioning device and reducing a power output of said electrical heating element after reaching said predetermined desired temperature, so that said predetermined desired temperature is substantially maintained; and switching said electrical heating element off once said seat contact surface and surrounding seat regions are completely heated, and operating said air-conditioning device so that said predetermined desired temperature is substantially maintained by supplying air-conditioned air to said seat contact surface.

16. The method according to claim 11, wherein said air is repeatedly cooled for a short time to a temperature that lies clearly below a predetermined desired temperature.

17. The method according to claim 11, wherein said seat contact surface of a back rest and of said seat surface are cooled alternatively.

* * * * *